Nov. 20, 1923.

B. POWERS

SEPARATOR ELEMENT

Filed April 17, 1923

1,474,440

INVENTOR.
Bert Powers.

BY
Geo. F. Kimmel
ATTORNEY.

Patented Nov. 20, 1923.

1,474,440

UNITED STATES PATENT OFFICE.

BERT POWERS, OF GASTON, INDIANA.

SEPARATOR ELEMENT.

Application filed April 17, 1923. Serial No. 632,723.

*To all whom it may concern:*

Be it known that I, BERT POWERS, a citizen of the United States, residing at Gaston, in the county of Delaware and State of Indiana, have invented certain new and useful Improvements in Separator Elements, of which the following is a specification.

This invention relates to a separator element designed primarily for use in connection with machines for separating tomatoes into various grades, such as to sizes, but it is to be understood that a separator element in accordance with this invention can be employed for separating other vegetables, as well as fruits, or for any purposes wherein it is found applicable, and the invention has for its object to provide, in a manner as hereinafter set forth, a traveling sprocket driven separator element provided with hinged sets of pivotally connected apertured separating members, the members of one set having means associated with members of adjacent sets and in connection with the apertures of the members of each set providing for the passage of the smaller objects during the travel of the separator element, whereby the smaller objects will be separated from the larger objects without agitating the objects to an extent to bruise them or subjecting the objects during separation to sudden or sharp blows common to stationary or independently driven agitators for separating purposes.

A further object of the invention is to provide a separator element, in a manner as hereinafter set forth, whereby the length and width thereof can be increased or decreased in a convenient manner when occasion so requires.

A further object of the invention is to provide, in a manner as hereinafter referred to, a separator element for the purpose set forth, whereby when one of the separator members becomes damaged it can be removed and a new one substituted without discarding the separator element as an entirety.

A further object of the invention is to provide, in a manner as hereinafter referred to, a separator element for the purpose set forth including inter-changeable sets of separator members whereby any set can be employed at any point throughout the length of the separator element.

Further objects of the invention are to provide, in a manner as hereinafter set forth, a separator element which is simple in its construction and arrangement, readily assembled and disassembled when occasion so requires, strong, compact, capable of having the length and width thereof increased or diminished when desired, thoroughly efficient in its use and comparatively inexpensive to manufacture.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

A separator element in accordance with this invention consists of a series of sets of separator members and with one set hinged to a pair of adjacent sets. The sets are detachably connected together and each set consists of a pair of outer separator members and one, two or three intermediate separator members depending on the width of the separator element desired. By way of example, each set of separator members is illustrated as consisting of but three members, a pair of outer separator members and an intermediate member, but as before stated, the number of intermediate members can be increased if desired.

But one set of separator members will be described as the description of said set will apply to each of the other sets which constitute the separator element.

The outer separator members of each set are indicated at 1, 2, and the intermediate separator member of each set is indicated at 3.

Each of the separator members is constructed of suitable metallic material of the desired thickness, but it is to be understood that the material from which the separator members are constructed may be other than metal, such as fiber, or any other suitable material adapted for the purpose.

Figure 1:
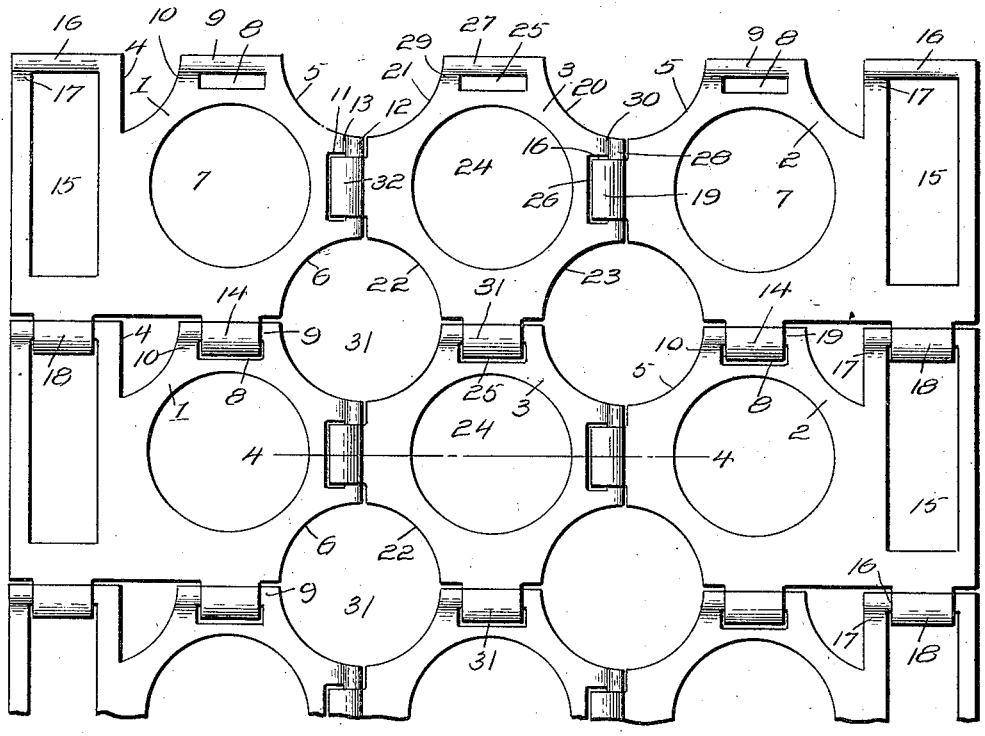
Figure 1 is a top plan view, broken away, of a separator element in accordance with this invention.
Figure 2:
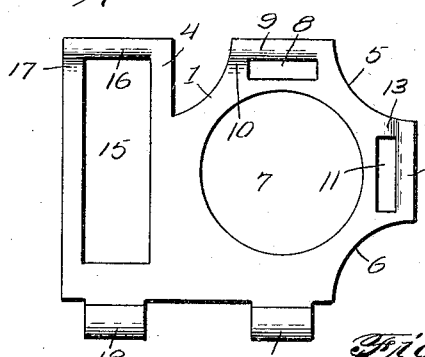
Figure 2 is an elevation of one of the outer separator members of a set of separable members.
Figure 3:
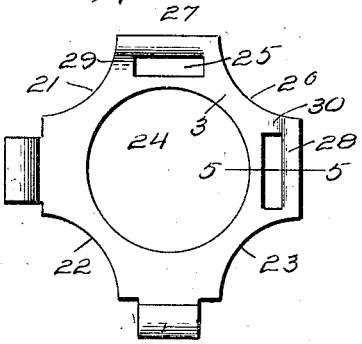
Figure 3 is an elevation of one of the intermediate separator members of a set of separator members.
Figures 4, 5:
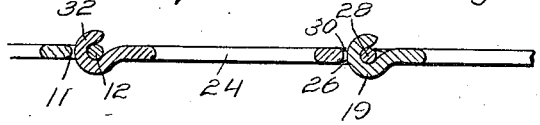
Figure 4 is a section on line 4—4, Figure 1.
Figure 5 is a section on line 5—5, Figure 3.

The outer separator member 1 is constructed from a flat body portion substantially rectangular in contour, having one side cut away to form a quadrant shaped recess 4, and its inner corners cut away in a segment shaped manner as at 5, 6. The member 1 has an enlarged circular opening 7, which is eccentrically disposed with respect to the length of the body of the member 1. That side of the body portion of the member 1, which is provided with a quadrant shaped opening 4, at a point between the opening 7 and the edge of said side, the body portion of the member 1 is formed with a rectangular opening 8 and the material of the body extended from the outer side wall of the opening 8 is rounded, as at 9, and the body portion of the member 1, at the side of the outer end wall of the opening 8 is inset on each of its faces to provide a groove 10, in a manner as shown in Figure 5. The grooves 10 are provided for a purpose to be presently referred to.

The body portion of the member 1, between its inner end and the opening 7, is formed with a rectangular opening 11 and the material leading from the outer side wall of the opening 11 to the inner end of the body portion of the member 1, is rounded, as at 12, and the material of the body portion of the member 1, leading from one end wall of the opening 11, is inset to provide a groove 13, similar to the groove 10 and in a manner as shown in Figure 5. The groove 13 is in each face of the body portion of the member 1.

That side of the body portion of the member 1, opposite the side in which the opening 8 is provided, is formed with an integral hook 14, which is circular in cross section.

The body portion of the member 1, between the outer end of said member and the cut away portion 4, is provided with an enlarged transversely extending rectangular opening 15, and the material from which the body portion of the member 1, which extends from one end wall of the opening 15, is rounded as at 16, and the outer end of the body portion of the member 1, in proximity to the rounded portion 16 has each of its faces inset to provide grooves 17, in the same manner as shown in Figure 5 and which are similar to the grooves 10 and 13.

That side of the body portion of the member 1, which is provided with a hook 14, has also formed integral therewith a hook 18, which is arranged in proximity to the outer end of the body portion of the member 1 and is also spaced from the hook 14. The hook 18 is circular in cross section.

The rounded portions 9 and 16, provide what may be termed pivots and the opening 15 is arranged for the purpose of receiving the sprocket of a sprocket driving element.

The outer separator member 2 is constructed in the same manner as the outer separator member 1, with this exception, that the opening 11, rounded portion 12 and grooves 13 at the inner end of the body portion of the member 2 are dispensed with and in lieu thereof the inner end of the body portion of the member 2 is formed with an integral laterally extending hook 19 which is circular in cross section. Otherwise than that as stated, the member 2 is constructed similar to the member 1 and similar reference characters employed in connection with member 1 are applied to member 2 to indicate parts corresponding to those shown and referred to in connection with member 1.

The body portion of the intermediate member 3 is formed from a square blank having each of the corners thereof, as indicated at 20, 21, 22 and 23, cut away in a segment shaped manner and so arranged whereby the cut away portions 20 and 23 will be oppositely disposed with respect to each other and with the cut away portions 21 and 22 also arranged oppositely disposed with respect to each other. The cut away portions 20 and 21 extend in opposite directions with respect to each other and the cut away portions 22, 23 are set up in a like manner. The body portion of the member 3 is formed centrally with an enlarged circular opening 24 of the same diameter as the opening 7, and between the edge of the opening 24 and two sides of the body portion of the member 3, the said body portion is provided with a pair of rectangular openings 25, 26, the latter extends at right angles with respect to the former, and the material of the body portion of the member 3, between one side wall of a rectangular opening and its opposed side edge of the member 3, is rounded as at 27, 28. The body portion of the member 3, to one side of an end wall of the opening 25 and also to one side of an end wall of the opening 26 is inset on both faces to provide grooves, as indicated at 29, 30, and as shown at 30 in Figure 5, the grooves 29 and 30 are set up in the same manner as the grooves 10 and 13 of the members 1 and 2.

The side of the body portion of the member 3, or opposite that side provided with the opening 5, is formed with an integral hook 31 which projects therefrom and is semi-circular in cross section.

The member 3 at that side opposite the side provided with the opening 26 has formed integral therewith a hook 32 which projects therefrom and is semi-circular in cross section.

When the members of a set of separator members are set up in operative position, the openings 8 of the members 1 and 2 align with the opening 25 of the member 3, and the hook 19 of the member 2 engages in the opening 26 of the member 3 whereby the hook 26 will overlap the rounded portion 28 and the latter constitutes a pivot for the hook. The hook 32 of the member 3 extends through the opening 11 and overlaps the rounded portion 12 of the member 1, and said rounded portion 12 constitutes a pivot for the hook 32. The grooves 30 permit of the connecting of the hook 19 with the member 3 and the grooves 13 permit of the connecting of the hook 32 with the member 1. The grooves 30 permit of the hook 19 being slid to position with respect to the opening 26 so that the member 2 can be coupled to one side of the member 3. The groove 13 permits of the hook 32 being slid to position with respect to the opening 11 so that the member 3 can be coupled to one side of the member 1.

When a set of separator members is connected to an adjacent set of separator members, the hooks 14 of the members 1 and 2 of one set are extended through the openings 8 of the members 1 and 2 of an adjacent set and the hook 31 of the member 3 is connected to the opening 25 of the member 3 of the adjacent set, and the hooks 18 of the members 1 and 2 are connected to the members 1 and 2 of the adjacent set by the extending of said hooks through the openings 15 of the members 1 and 2 of an adjacent set to overlap the rounded portion 16 of said members. The grooves 10 and 29 permit of the hooks 14 and 31 being positioned with respect to the members of the adjacent set, and the grooves 17 permit of the hooks 18 being positioned with respect to the members of an adjacent set.

The hooks 19 and 32 in connection with the pivots 12 and 28, and further in connection with the openings 11 and 16 provide means for pivotally connecting the outer members to the intermediate member of the set, and the hooks 14, 18 and 31 of the members of one set, in connection with the openings 8, 25 and pivots 9, 27 of an adjacent set provide means for hinging one set of separator members to an adjacent set of separator members.

When the sets of separator members are connected together the curved edges 5, 20 and 21 of one set form a continuation of the curved edges 6, 22 and 23 of an adjacent set thereby providing circular openings 31 of the same diameter as the opening 7. The openings 31 are staggered with respect to the opening 7 and said openings 31 are formed between the sets, whereas the openings 7 are arranged centrally of each set.

When two or more intermediate members 3 are employed in connection with each set, to increase the width of the separator element, the said intermediate members are connected together and also to the end members 1 and 2.

The manner of setting up the separator members, so that they will be detachably connected together, permits of a damaged member to be removed and a new one substituted thereby overcoming the discarding of the separator element as an entirety.

The walls of the openings 7 and 31 are rounded in a manner as indicated at 32, Figure 4.

Although the preferred embodiment of the separator element in accordance with this invention is as described and illustrated, yet it is to understood that changes in the details of construction can be had which will fall within the light of the invention as claimed.

What I claim is:—

1. A separator element for the purpose set forth comprising a plurality of opposed hinged sets of flat separator members, the members of each set provided with openings for the passage of the objects to be separated and the members of the opposed sets provided with associated means to form additional openings for the passage of the objects to be separated, the outer members of each set each having its outer end provided with an opening for the reception of a sprocket of a driving element for the separator element.

2. A separator element for the purpose set forth comprising a plurality of opposed hinged sets of flat separator members, the members of each set provided with openings for the passage of the objects to be separated and the members of the opposed sets provided with associated means to form additional openings for the passage of the objects to be separated, the said additional openings being staggered with respect to said first mentioned opening, the outer members of each set each having its outer end provided with an opening for the reception of a sprocket of a driving element for the separator element.

3. A separator element for the purpose set forth comprising a plurality of opposed hinged sets of flat separator members, the members of each set provided with means for detachably and pivotally connecting them together and each further provided with an opening for the passage of the objects to be separated, and the members of the opposed sets provided with associated means to form additional openings for the passage of the objects to be separated, the outer members of each set each having its outer end provided with an opening for the reception of a sprocket of a driving element for the separator element.

4. A separator element for the purpose set forth comprising a plurality of opposed hinged sets of flat separator members, the members of each set provided with means for detachably and pivotally connecting them together and each further provided with an opening for the passage of the objects to be separated, and the members of the opposed sets provided with associated means to form additional openings for the passage of the objects to be separated, the said additional openings being staggered with respect to said first mentioned openings, the outer members of each set each having its outer end provided with an opening for the reception of a sprocket of a driving element for the separator element.

5. A separator element for the purpose set forth comprising a plurality of opposed hinged sets of flat separator members, the inner of said members of said sets comprising a body portion formed with the corners cut away to form curved edges and further provided with a pair of rectangular openings, a pair of outwardly projecting hooks and a centrally disposed opening, the outer of said members of said sets each comprising a body portion having the corners cut away to provide curved edges and further provided with a pair of rectangular openings, one of greater length than the other and extending at right angles with respect thereto, each of said outer members having its body portion further provided at one side with a pair of spaced hooks and further with a circular opening, one of the outer members of each set having its inner end formed with a lateral hook and the other outer member of each set having its inner end formed with a rectangular opening, said hooks and rectangular openings providing means for detachably and pivotally connecting the members of a set together and further for hinging one set to a pair of opposed sets.

6. A separator element for the purpose set forth comprising a plurality of opposed hinged sets of flat separator members, the members of each set being pivotally and detachably connected together and the outer members of each set formed with an opening for the reception of a sprocket of a driving element and further formed at a point removed from said opening with an opening for the passage of the objects to be separated.

7. A separator element for the purpose set forth comprising a plurality of opposed hinged sets of flat separator members, the members of each set being pivotally and detachably connected together and the outer members of each set formed with an opening for the reception of a sprocket of a driving element and further formed at a point removed from said opening with an opening for the passage of the objects to be separated, and the members of opposed sets provided with associated means to form additional openings for the passage of the objects to be separated.

8. A separator element for the purpose set forth comprising a plurality of opposed hinged sets of flat separator members, the members of each set being pivotally and detachably connected together and the outer members of each set formed with an opening for the reception of a sprocket of a driving element and further formed at a point removed from said opening with an opening for the passage of the objects to be separated, and the members of opposed sets provided with associated means to form additional openings for the passage of the objects to be separated, and with such openings being staggered with respect to the first mentioned openings for the passage of the objects to be separated.

In testimony whereof, I affix my signature hereto.

BERT POWERS.